(12) United States Patent
Yeung et al.

(10) Patent No.: US 12,525,315 B2
(45) Date of Patent: Jan. 13, 2026

(54) EFFICIENT READ DISTURB SCANNING

(71) Applicant: Micron Technology, Inc., Boise, ID (US)

(72) Inventors: Chun Sum Yeung, San Jose, CA (US); Deping He, Boise, ID (US); Zhongyuan Lu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 98 days.

(21) Appl. No.: 18/600,360

(22) Filed: Mar. 8, 2024

(65) Prior Publication Data
US 2024/0312554 A1    Sep. 19, 2024

Related U.S. Application Data

(60) Provisional application No. 63/490,044, filed on Mar. 14, 2023.

(51) Int. Cl.
*G11C 29/52* (2006.01)
*G11C 11/406* (2006.01)
*G11C 29/02* (2006.01)

(52) U.S. Cl.
CPC ........ *G11C 29/52* (2013.01); *G11C 11/40622* (2013.01); *G11C 29/022* (2013.01)

(58) Field of Classification Search
CPC .. G11C 29/52; G11C 11/40622; G11C 29/022
See application file for complete search history.

(56) References Cited

U.S. PATENT DOCUMENTS

| | | | | |
|---|---|---|---|---|
| 11,756,604 B2 * | 9/2023 | Kwong | ............... | G11C 11/4096 365/189.14 |
| 2024/0168879 A1 * | 5/2024 | Goda | .................. | G06F 12/0246 |

* cited by examiner

*Primary Examiner* — Han Yang
(74) *Attorney, Agent, or Firm* — Holland & Hart LLP

(57) ABSTRACT

Methods, systems, and devices for efficient read disturb scanning are described. A memory system may limit a quantity of word lines scanned as part of a read disturb scan. For example, the memory system may select a threshold quantity of word lines of a block for the read disturb scan based on a characterization of the word lines, such as selecting one or more word lines having higher bit error rates than other word lines of the block. The memory system may perform the read disturb scan on the selected one or more word lines to determine respective failure bit counts of the selected word lines and exclude unselected word lines of the block from the read disturb scan. The memory system may determine whether to perform a refresh operation on the block based on whether a respective failure bit count satisfies a threshold failure bit count.

20 Claims, 7 Drawing Sheets

| Threshold Failure Bit Count | Operation |
|---|---|
| T1 | Scale read disturb scan threshold: 75% |
| T2 | Scale read disturb scan threshold: 50% |
| T3 | Scale read disturb scan threshold: 25% |
| T4 | Perform refresh |

FIG. 3

EFFICIENT READ DISTURB SCANNING

CROSS REFERENCE

The present application for patent claims priority to and the benefit of U.S. Provisional Application No. 63/490,044 by Yeung et al., entitled "EFFICIENT READ DISTURB SCANNING," filed Mar. 14, 2023, assigned to the assignee hereof, and is expressly incorporated by reference in its entirety herein.

TECHNICAL FIELD

The following relates to one or more systems for memory, including efficient read disturb scanning.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 3 illustrates an example of a threshold diagram that supports efficient read disturb scanning in accordance with examples as disclosed herein.

DETAILED DESCRIPTION

Figure 1:
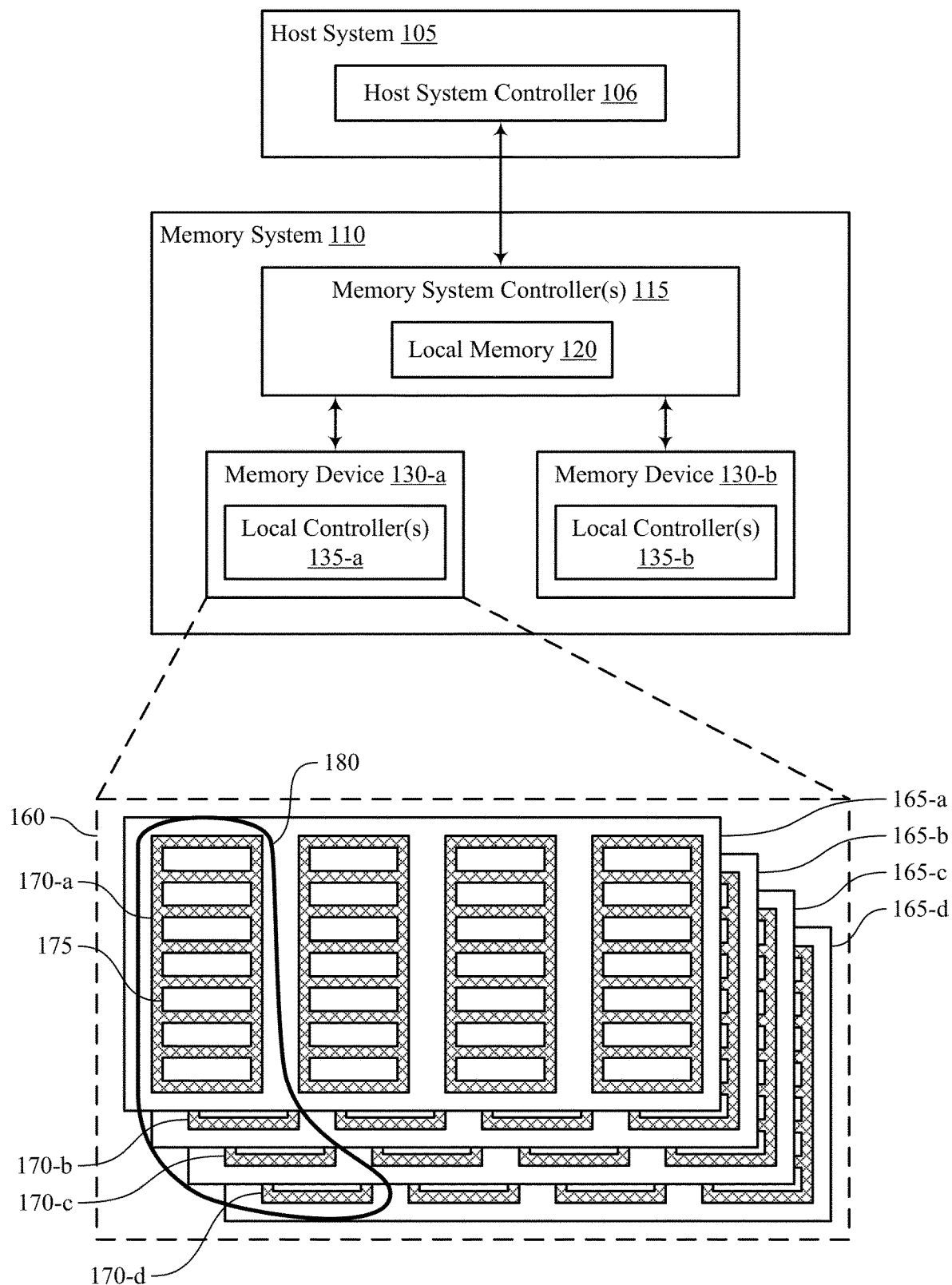
FIG. 1 illustrates an example of a system that supports efficient read disturb scanning in accordance with examples as disclosed herein.

A memory system may include blocks that include sets of pages of memory cells. In some cases, memory cells within the memory system may experience a phenomenon that may be referred to as read disturb. For example, reading data from a page may cause the threshold voltages of other memory cells in the same block to shift to a different value. While a single threshold voltage shift may be relatively small, such shifts can accumulate over time, eventually becoming large enough to alter the state of some memory cells and result in read disturb errors. To mitigate the effects of read disturb, the memory system may periodically (e.g., after performing a threshold quantity of read operations on a block) perform a read disturb scan on the block to determine whether to refresh the block. In some cases, the memory system may scan each word line of the block to determine a respective failure bit count of the word line, which may indicate whether to refresh the block. For example, if at least one of the determined failure bit counts satisfies a threshold failure bit count, the memory system may perform a refresh operation on the block (e.g., re-write the data to the pages of the block, such as to reset the threshold voltages and states of the memory cells). However, scanning each word line may reduce a performance of the memory system, such as from the perspective of a host system coupled with the memory system, as read disturb scans may include internal read operations that block access by the host system. That is, the longer it takes to perform the read disturb scan, the longer the host system may be unable to access the block, among other disadvantages.

In accordance with examples described herein, the memory system may limit the quantity of word lines scanned as part of a read disturb scan to reduce a latency associated with performing the read disturb scan. For example, if triggered to perform the read disturb scan, the memory system may select one or more word lines of a block (e.g., a threshold quantity of word lines) for the read disturb scan while excluding other word lines of the block. To support such features while maintaining accurate triggering of refreshing the block, the memory system may select the one or more word lines for the read disturb scan based on a characterization of the word lines. For example, the memory system may select the word lines having higher bit error rates than other word lines of the block for the read disturb scan. Accordingly, the word lines with a higher likelihood (e.g., a highest likelihood) of having the highest failure bit counts may be scanned to determine whether to refresh the block (e.g., such as whether a determined failure bit count satisfies a threshold failure bit count), while other word lines may be excluded from the scanning. In some examples, the memory system may store an indication of which word lines are to be selected for the read disturb scan and may select the one or more word lines in accordance with the indication. Reducing the quantity of word lines scanned as part of the read disturb scan may reduce a latency of performing the read disturb scan, thereby increasing performance of the memory system and reducing a time that the host system is blocked from accessing a given block, among other benefits.

In addition to applicability in memory systems as described herein, techniques for improved read disturb scanning may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating more efficient read disturb scanning, which may decrease processing or latency times, improve response times, or otherwise improve performance and user experience, among other benefits.

Features of the disclosure are initially described in the context of systems, devices, and circuits with reference to FIG. 1. Features of the disclosure are described in the context of a memory system, threshold diagram, and flowcharts with reference to FIGS. 2 through 5. These and other features of the disclosure are further illustrated by and described in the context of an apparatus diagram and flowchart that relate to efficient read disturb scanning with reference to FIGS. 6 through 7.

FIG. 1 illustrates an example of a system 100 that supports efficient read disturb scanning in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), one or more memory controllers (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between host system controller(s) 106 of the host system 105 and memory system controller(s) 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller(s) 115 may be coupled with and communicate with the host system 105 (e.g., via the physical host interface) and may be an example of a controller or control component configured to cause the memory system 110 to perform various operations in accordance with examples as described herein. The memory system controller(s) 115 may also be coupled with and communicate with memory devices 130 to perform operations such as reading data, writing data, erasing data, or refreshing data at a memory device 130—among other such operations—which may generically be referred to as access operations. In some cases, the memory system controller(s) 115 may receive commands from the host system 105 and communicate with one or more memory devices 130 to execute such commands (e.g., at memory arrays within the one or more memory devices 130). For example, the memory system controller(s) 115 may receive commands or operations from the host system 105 and may convert the commands or operations into instructions or appropriate commands to achieve the desired access of the memory devices 130. In some cases, the memory system controller(s) 115 may exchange data with the host system 105 and with one or more memory devices 130 (e.g., in response to or otherwise in association with commands from the host system 105). For example, the memory system controller(s) 115 may convert responses (e.g., data packets or other signals) associated with the memory devices 130 into corresponding signals for the host system 105.

The memory system controller(s) 115 may be configured for other operations associated with the memory devices 130. For example, the memory system controller(s) 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller(s) 115 may include hardware such as one or more integrated circuits or discrete components, a buffer memory, or a combination thereof. The hardware may include circuitry with dedicated (e.g., hardcoded) logic to perform the operations ascribed herein to the memory system controller(s) 115. The memory system controller(s) 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller(s) 115 may also include a local memory 120. In some cases, the local memory 120 may include read-only memory (ROM) or other memory that may store operating code (e.g., executable instructions) executable by the memory system controller(s) 115 to perform functions ascribed herein to the memory system controller(s) 115. In some cases, the local memory 120 may additionally, or alternatively, include static random access memory (SRAM) or other memory that may be used by the memory system controller(s) 115 for internal storage or calculations, for example, related to the functions ascribed herein to the memory system controller(s) 115. Additionally, or alternatively, the local memory 120 may serve as a cache for the memory system controller(s) 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller(s) 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller(s) 115. In general, one or more functions ascribed herein to the memory system controller(s) 115 may, in some cases, be performed instead by the host system 105, local controller(s) 135, or any combination thereof. In some cases, a memory device 130 that is managed at least in part by memory system controller(s) 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) one or more local controllers 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support efficient read disturb scanning. For example, the host system 105 (e.g., host system controller(s) 106), the memory system 110 (e.g., memory system controller(s) 115), or a memory device 130 (e.g., local controller(s) 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by host system controller(s) 106), by the memory system 110 (e.g., by memory system controller(s) 115), or by a memory device 130 (e.g., by local controller(s) 135), may cause the host system 105, the memory system 110, or the memory device 130 to perform associated functions as described herein.

In some cases, memory cells within the memory system 110 may suffer from read disturb, in which reading data from a page 175 of a block 170 (e.g., block 170-*a*) may shift the threshold voltages of other memory cells in the same block 170 such that the state of some memory cells may be altered, thereby resulting in read disturb errors. To mitigate the effects of read disturb, the memory system 110 may periodically (e.g., after performing a threshold quantity of read operations on a block 170) perform a read disturb scan on the block 170 to determine whether to refresh the block 170. In some cases, the memory system 110 may scan each word line of the block 170 to determine a respective failure bit count of the word line and to determine whether to refresh the block 170. However, scanning each word line may reduce a performance of the memory system 110, as read disturb scans may include internal read operations that block access by the host system 105. That is, the longer it takes to perform the read disturb scan, the longer the host system 105 may be unable to access the block 170, among other disadvantages.

In accordance with examples described herein, the memory system 110 (e.g., the memory system controller(s) 115) may reduce the quantity of word lines scanned as part of a read disturb scan to reduce a latency associated with performing the read disturb scan. For example, if triggered to perform the read disturb scan, the memory system 110 may select one or more word lines of a block 170, while excluding other word lines of the block 170, for the read disturb scan based on a characterization of the word lines. For instance, the memory system 110 may select a subset of the word lines (e.g., a subset including a threshold percentage, such as 10%, among other quantities, of the total quantity of word lines of the block 170, a subset including a configured quantity of word lines of the block 170) having the highest bit error rates compared to the other word lines of the block 170 for the read disturb scan. Accordingly, the word lines with a higher likelihood (e.g., a highest likelihood) of having the highest failure bit counts may be scanned to determine whether to refresh the block 170 (e.g., such as whether a determined failure bit count satisfies a threshold failure bit count), while other word lines may be excluded from the scanning. Reducing the quantity of word lines scanned as part of the read disturb scan may reduce a latency of performing the read disturb scan, thereby increasing performance of the memory system and reducing a time that the host system 105 is blocked from accessing a given block 170, among other benefits.

In addition to applicability in memory systems as described herein, techniques for reducing the quantity of word lines read in a read disturb scan may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by decreasing the amount of time that a host is blocked from accessing blocks (e.g., blocks 170, virtual blocks 180) while maintaining low bit error counts in the blocks, which may also decrease processing or latency times, improve response times, or otherwise improve user experience, among other benefits.

Figure 2:
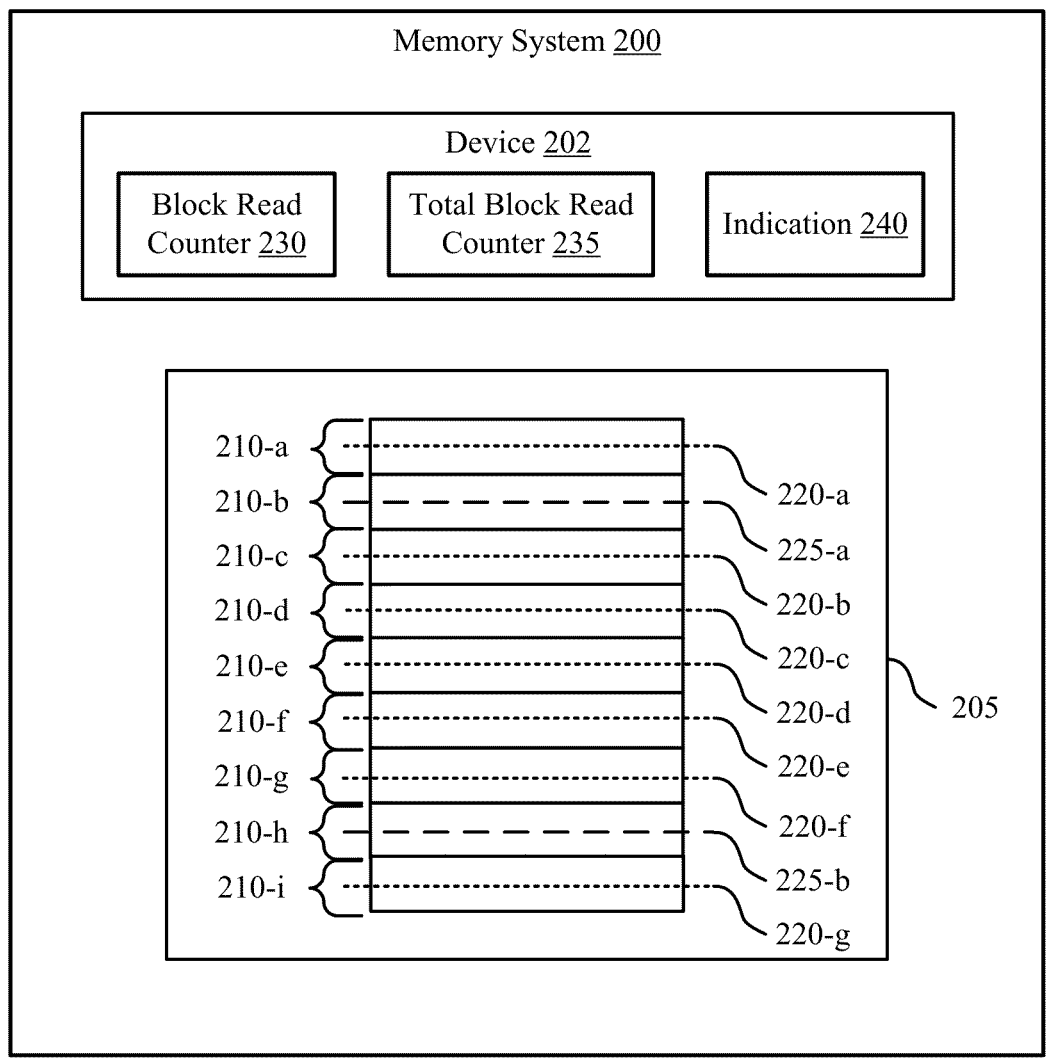
FIG. 2 illustrates an example of a memory system that supports efficient read disturb scanning in accordance with examples as disclosed herein.

FIG. 2 illustrates an example of a memory system 200 that supports efficient read disturb scanning in accordance with examples as disclosed herein. The memory system 200 may implement or be implemented by aspects of the system 100. For example, the memory system 200 may be an example of a memory system 110 described with reference to FIG. 1. The memory system 200 may include one or more blocks 205, which may be examples of a block 170 or a virtual block 180. Each block 205 may include pages 210 (e.g., pages 175). Each page 210 may contain memory cells coupled with a word line 220 or a word line 225 (e.g., a word line with a bit error rate that satisfies a threshold, a word line with a higher bit error rate than the other word lines 220) that the memory system 200 may use to perform access operations on the memory cells of the page 210. For example, the block 205 may include pages 210-*a* through 210-*i* that are each coupled with a respective word line (although other quantities of pages 210 and word lines in a block 205 are possible). In the example of FIG. 2, the pages 210-*a*, 210-*c* through 210-*g*, and 210-*i* (e.g., the memory cells of these pages 210) may be coupled with word lines 220-*a* through 220-*g*, respectively, and the pages 210-*b* and 210-*h* may be coupled with word lines 225-*a* and 225-*b*, respectively. In some examples, the word lines 225 may be referred to as weak word lines or the "worst" word lines of the block 205, for example, due to being associated with higher bit error rates than the word lines 220.

The memory system 200 may include a device 202 that stores (e.g., implements, includes, supports) a block read counter 230, a total block read counter 235, an indication 240 that may be used to determine which word lines to select during a read disturb scan, or any combination thereof. Performing a read disturb scan on a word line, which may be referred to as scanning a word line, may include reading the memory cells of a page 210 coupled with the word line and determining (e.g., counting, scanning) a quantity of failures of (e.g., errors in reading) the bits stored by the memory cells. In some examples, the device 202 may be an example of a memory device 130 described with reference to FIG. 1. In some examples, the device 202 may be an example of a memory system controller 115 described with reference to FIG. 1. In some examples, one or more of the block read counter 230 (e.g., a value of the block read counter 230), the total block read counter 235 (e.g., a value of the total block read counter 235), or the indication 240 may be transferred between one or more memory devices 130 and memory system controller(s) 115. For example, the block read counter 230 and/or the total block read counter 235 may be maintained (e.g., updated) in the memory system controller(s) 115 and values of the counters may be stored (e.g., periodically) in a memory device 130.

During a read operation, word lines of the block 205 other than the read word line (e.g., the word line used to perform the operation) may experience changes to voltages (e.g., read disturbs) that alter (e.g., disturb) the values stored in the respective memory cells coupled with the word lines. For example, if the word line 220-*b* is used to read the page 210-*c* (e.g., which may include biasing the word line 220-*b* to a higher voltage, such as by applying one or more voltage pulses to the word line 220-*b*), then other word lines in the block 205 may experience at least a portion of the voltage applied to the word line 220-*b*, which may cause unintended shifts to the threshold voltages of the memory cells coupled with the other word lines and lead to read disturb errors (e.g., as the quantity of threshold voltage shifts accumulate with additional read operations performed on the block 205). In some examples, the portion of the voltage experienced by the other word lines may be referred to as a Vpass voltage. The shift in voltage may be greater for the word lines adjacent to the read word line, such as the word lines 225-*a* and 220-*c* that are adjacent to word line 220-*b*, than for other word lines in the block 205. The block read counter 230 may store (e.g., track) the quantity of read operations performed on the block 205. In some cases, in response to (e.g., upon) the block read counter 230 satisfying (e.g., being greater than, being greater than or equal to) a threshold quantity of read operations for the block 205, the memory system 200 may perform a read disturb scan to determine the status of word lines of the block 205 (e.g., respective failure bit counts of the word lines). In some examples, one page 210 coupled with each word line is scanned as part of the read disturb scan (e.g., if the word lines are coupled with multiple pages 210). The memory system 200 may reset the block read counter 230 after (e.g., in response to) performing the read disturb scan.

Based on the failure bit counts of the word lines of the block 205, the memory system 200 may determine whether to perform a refresh operation on the block 205 (e.g., to mitigate the effects of read disturb). For example, to perform the refresh operation, the memory system 200 may scan each word line (e.g., read a page 210 coupled with each word line) of the block 205 to determine a respective failure bit count associated with each word line, which may indicate whether to refresh the block 205. For example, if at least one of the determined failure bit counts satisfies (e.g., is greater than, is greater than or equal to) a threshold failure bit count, the memory system 200 may perform a refresh operation on the block 205. In some examples, performing the refresh operation may include re-writing the data to a target block from a source block, to reset the threshold voltages (e.g., states) of the memory cells. However, scanning each word line may reduce a performance and increase a latency of the memory system 200, such as from the perspective of a host system (e.g., a host system 105) coupled with the memory system 200. For example, read disturb scans may include internal read operations that block access to the block 205 by the host system (e.g., the host system may be unable to read the block 205 while the read disturb scan is being performed). Thus, increase a duration of time it may take to execute a command received from the host system because background operations (e.g., the read disturb scan) are occurring. That is, the longer it takes to perform the read disturb scan, the longer the host system may be unable to access the block 205, which may increase a latency associated with reading the block 205 (e.g., delay read operations performed on the block), among other disadvantages.

In accordance with examples described herein, the memory system 200 may limit the quantity of word lines scanned as part of a read disturb scan to reduce a latency associated with performing the read disturb scan. For example, if triggered to perform the read disturb scan (e.g., in response to the value of the block read counter 230 satisfying the threshold quantity of read operations), the memory system 200 may select a threshold quantity of word lines (e.g., select the word lines 225) of a block 205 for the read disturb scan while excluding the word lines 220 of the block 205. The memory system may select the word lines 225 for the read disturb scan, for example, due to the word lines 225 having higher bit error rates than the other word lines 220 of the block 205 and therefore being the most likely to have the highest failure bit counts. Accordingly, the word lines 225 (with a higher likelihood (e.g., a highest likelihood) of having the highest failure bit counts) may be scanned to determine whether to refresh the block 205 (e.g., such as whether at least one of one or more determined failure bit counts satisfy the threshold failure bit count), while other word lines 220 may be excluded from the scanning.

The refresh operation may be triggered, for example, if at least one of the word lines scanned has a failure bit count that satisfies a first threshold failure bit count (although other parameters to trigger the refresh operation are possible, such as if each of the determined failure bits counts satisfy the first threshold failure bit count, among other possibilities). In some examples, the threshold quantity of read operations that triggers the read disturb scan (e.g., the value of the block read counter 230 that triggers the read disturb scan) may be adjusted based on a failure bit count failing to satisfy (e.g., being less than, being less than or equal to) the first threshold failure bit count but satisfying a second threshold failure bit count, as described with reference to FIGS. 3 and 5. In some examples, the memory system 200 may store an indication 240 of which word lines of the block 205 (e.g., the word lines 225) are to be selected for the read disturb scan and may select the one or more word lines in accordance with the indication. In some examples, the threshold quantity of word lines to be selected may be stored in the indication 240. In some examples, the indication 240 may be statically stored (e.g., stored such that the indication 240 is unchangeable) to the memory system 200, such as to the device 202 (e.g., in firmware of the memory system 200).

Limiting the quantity of word lines to the word lines 225 scanned as part of the read disturb scan will reduce a latency of performing the read disturb scan, thereby increasing performance of the memory system 200 and reducing a time that the host system is blocked from accessing the block 205. Further, because the word lines 225 associated with the highest failure bit counts are scanned, the memory system 200 may maintain an accuracy in determining whether to trigger a refresh operation. For example, because the word lines 220 may be associated with lower failure bit counts than the word lines 225, and because the refresh operation may be triggered if at least one failure bit count satisfies the first threshold failure bit count, limiting the quantity of word lines of the block 205 scanned to the word lines 225 may produce a same determination of whether to trigger the refresh operation as if all of the word lines of the block 205 were scanned.

The word lines 225 may have higher bit error rates than the other word lines 220, which may result in the word lines 225 having higher bit failure counts than the word lines 220. A word line 225 may have a higher bit error rate than the other word lines 220 due to manufacturing processes or other reasons, and there may be any quantity of word lines 225 (e.g., two word lines 225 in a block 205) selected for the read disturb scan. In some examples, the word lines 225 may constitute a threshold percentage of the word lines of the block 205, such as 10%, among other quantities, of the total quantity of word lines of the block 205 that are associated with the higher bit error rates of the block 205 (e.g., the highest bit error rates in the block 205). In other examples, the word lines 225 may constitute a configured quantity (e.g., two in the example of FIG. 2) of word lines of the block 205 that have the highest bit error rates compared to the other word lines 220 of the block 205. In some examples, the threshold quantity of word lines selected for the read disturb scan may be the single word line associated with the highest bit error rate relative to the other word lines of the block 205. For example, if the word line 225-*a* is associated with the highest bit error rate (e.g., higher than the word line 225-*b*), the word line 225-*a* may be selected for the read disturb scan and the other word lines of the block 205, including the word line 225-*b*, may be excluded from the read disturb scan. In some examples, the threshold quantity of word lines selected for the read disturb scan may be the single word line associated with higher bit error rates relative to the other word lines of the block 205, but it may not have the highest bit error rate (e.g., of word lines of the memory system 200). In some examples, the word lines selected for the read disturb scan may be word lines associated with relatively high bit error rates (e.g., but not the highest bit error rate), such as word lines having bit error rates that satisfy (e.g., are greater than, are greater than or equal to) one or more threshold bit error rates.

In some examples, the word lines of a block 205 may be characterized (e.g., tested to determine the bit error rates, and/or the relative bit error rates, of each word line) as part of a manufacturing of the memory system 200 (e.g., as part of a testing phase of the memory system 200). In some examples, the word lines may be characterized at the component level (e.g., memory systems manufactured according to similar processes may share a same or similar characterization of word lines). That is, the word lines with higher bit error rates (e.g., highest bit error rates relative to other word lines of a block, the word lines 225) for the memory system 200 may be located within the block 205 in an arrangement similar to the relative locations of such word lines for similar memory systems 200. As such, in some examples, the specific word lines of the memory system 200 may not have been tested to identify the word lines 225, but similar word lines of one or more other similar memory systems 200 may have been characterized to identify the word lines 225 of the similar memory systems 200, and such characterization may be applied to the memory system 200 to identify the word lines 225 of the memory system 200. In some examples, the word lines for a subset of the blocks 205 of the memory system 200 may be characterized to determine the word lines 225 and the characterization of the subset of the blocks 205 may be applied to the other blocks 205 of the memory system to identify the word lines 225 of the other blocks 205.

The indication 240 may be generated and stored in accordance with the characterization of the word lines of the block 205. For example, the word lines 225 may be selected (e.g., identified, determined) from the word lines of the block 205 in accordance with the characterization of the block 205, and the indication 240 may be generated and stored to the memory system to indicate the selected word lines 225 of the block 205. In some examples, the indication 240 may be applicable to multiple blocks 205 of the memory system 200. That is, the indication 240 may be read to determine which word lines to select for the read disturb scan in response to each of multiple different blocks 205 respectively having had the threshold quantity of read operations performed on the block 205. In some examples, the memory system 200 may store a respective indication 240 for each block 205. In some examples, different blocks 205 may have different word lines that are the word lines 225 (e.g., in accordance with a characterization of the blocks 205). Here, different indications 240 corresponding to the different blocks 205 and indicating the respective word lines 225 may be generated and stored to the memory system 200.

In some examples, the word lines 225 may be scanned in an order during the read disturb scan. For example, the word line 225 (e.g., 225-*b*) with the highest bit error rate compared to other word lines 225 may be scanned first. Then the word line 225 (e.g., 225-*a*) with the second highest bit error rate compared to other word lines 225 may be scanned next. The read disturb scan may continue this order until all word lines 225 are scanned. In some examples, the memory system 200 may preemptively stop the read disturb scan (e.g., before scanning all of the word lines 225), for example, in response to a failure bit count of one of the word lines 225 in the order having a failure bit count that satisfies the first threshold failure bit count.

The predictability of which word lines have higher (e.g., the highest) bit error rates may decrease over time (such as due to variances in degradation of various memory systems over time). In other words, the word lines 225 may not be associated with bit error rates higher than the bit error rates of word lines 220 as the total quantity of read operations performed on block 205 increases. As such, an accuracy of triggering the refresh operation based on the limited scanning of the word lines 225 may be reduced as the total quantity of read operations performed on the block 205 increases. For example, the word lines that have the higher bit error rates may change as the memory device goes through higher quantities of program/erase cycles. In some examples, the memory system 200 may revert to performing the read disturb scan on all word lines of the block 205 after a second threshold quantity of read operations is performed on the block. For example, the total block read counter 235 may track the total quantity of read operations performed on the block 205, while the block read counter 230 may track a respective quantity of read operations performed on the block 205 for the purposes of triggering the read disturb scan. That is, the block read counter 230 may be reset after each read disturb scan is performed, while the total block read counter 235 may not be reset. The memory system 200 may perform read disturb scans on all word lines of block 205 (e.g., both word lines 220 and word lines 225) after (e.g., in response to) a value of the total block read counter 235 satisfies (e.g., is greater than, is greater than or equal to) the second threshold quantity of read operations. In this way, the accuracy of triggering the refresh operation on the block 205 may be maintained as the memory system 200 ages.

The second threshold quantity of read operations that triggers the reversion to performing the read disturb scan on all of the word lines of the block 205 may be greater than the threshold quantity of read operations that triggers the performance of a respective read disturb scan. For example, the threshold quantity of read operations may (e.g., initially) be set to 1 million read operations (among other quantities), which may be subject to change as described with reference to FIG. 3, whereas the second threshold quantity of read operations may be 70 million read operations (among other quantities).

FIG. 3 illustrates an example of a threshold diagram 300 that supports efficient read disturb scanning in accordance with examples as disclosed herein. The threshold diagram 300 may be implemented by aspects of the systems described with reference to FIGS. 1 and 2, such as by a memory system, which may be an example of a memory system 110 or a memory system 200. The memory system may support performing various operations based on a result of a read disturb scan as described with reference to FIG. 2. For example, the memory system may perform the read disturb scan to determine one or more respective failure bit counts associated with word lines 225. The memory system may perform an operation depending on which, if any, failure bit count thresholds 305 are satisfied by a failure bit count (e.g., a highest failure bit count of the one or more failure bit counts).

For example, the memory system may perform operations 310 to adjust (e.g., modify, scale) a read disturb scan threshold depending on whether the highest failure bit count of the scanned word lines satisfies one or more failure bit count thresholds 305 (e.g., although in other examples, any determined failure bit count from the read disturb scan may be used, such as the lowest failure bit count of the scanned word lines, a median failure bit count, an average of the failure bit counts, among other possibilities). The thresholds 305 in the threshold diagram 300 may be ordered such that T1<T2<T3<T4. The read disturb scan threshold may be a threshold quantity of read operations performed on a block (e.g., block 205) that triggers a read disturb scan, as described with reference to FIG. 2. For example, a block read counter (e.g., block read counter 230) may store (e.g., track) a quantity of read operations that have been performed on the block and may be reset after a read disturb scan. The read disturb scan may be performed in response to the quantity of read operations on the block satisfying (e.g., being greater than, being greater than or equal to) the read disturb scan threshold (e.g., in response to the value of the block read counter satisfying the read disturb scan threshold). The memory system may perform a read disturb scan on one or more selected word lines of the block (e.g., the word lines 225) to determine respective failure bit counts of the scanned word lines.

The memory system may select a failure bit count of the determined failure bit counts for comparison against one or more failure bit count thresholds 305. For example, the memory system may compare the highest failure bit count (e.g., although other failure bit counts may be selected for the comparison, as described above) to one or more failure bit count thresholds 305 to determine whether to perform a refresh operation 315, adjust the read disturb scan threshold (e.g., perform an operation 310), or maintain the read disturb scan threshold at the same threshold value. If the highest (e.g., selected) failure bit count satisfies (e.g., is greater than, is greater than or equal to) a refresh operation threshold T4 (e.g., the highest threshold), the memory system may perform the refresh operation 315 on the block. However, if the highest failure bit count fails to satisfy (e.g., is less than, is less than or equal to) the threshold T4, but does satisfy one or more of the thresholds T1, T2, or T3 (e.g., thresholds lower than T4), the memory system may perform an operation 310 to adjust the read disturb scan threshold. The operation 310 (e.g., a single operation 310-*a*, 310-*b*, or 310-*c*) may be performed to adjust the read disturb scan threshold in response to the failure bit count satisfying the corresponding failure bit count threshold 305 (e.g., the highest satisfied failure bit count threshold 305-*a*, 305-*b*, 305-*c*), but not satisfying the next higher threshold (e.g., 305-*b*, 305-*c*, or 305-*d*). In other words, the memory system may perform a single operation 310 corresponding to a specific failure bit count threshold 305 satisfied by the failure bit count of a read disturb scan.

In some examples, the memory system may perform an operation 310 to adjust a first read disturb scan threshold (e.g., scale the first threshold) to set a second read disturb scan threshold as the threshold quantity of read operations that triggers a subsequent (e.g., next) read disturb scan. That is, the memory system may set the second read disturb scan threshold as the threshold quantity of read operations that triggers the read disturb scan by adjusting (e.g., scaling) the first read disturb scan threshold (e.g., the current read disturb scan threshold) in accordance with the failure bit count threshold 305 satisfied by the failure bit count of the read disturb scan.

For example, if the highest failure bit count fails to satisfy a first threshold 305-*a* (T1), the memory system may perform a second read disturb scan at 100% of the first read disturb scan threshold. In other words, the second read disturb scan threshold (e.g., 1 million read operations) may remain the same as the first read disturb scan threshold (e.g., 1 million read operations); that is, the first read disturb scan threshold may remain unchanged by the memory system. The second read disturb scan may be performed in response to the block read counter reaching the second read disturb scan threshold. In some examples, if a single block read counter is implemented to track the total quantity of read operations performed on the block (e.g., the total block read counter 235 is implemented without implementation of the block read counter 230), the memory system may perform the second read disturb scan after the block read counter reaches the first read disturb scan threshold plus the second read disturb scan threshold (e.g., 2 million read operations, 2 million read operations plus additional previous read disturb scan thresholds).

In another example, if the highest failure bit count satisfies the first threshold 305-a (T1) and fails to satisfy a second threshold 305-b (T2), the memory system may perform the second read disturb scan at 75% of the first read disturb scan threshold. In other words, the second read disturb scan threshold (e.g., 750,000 read operations) may be adjusted to be three-quarters of the first read disturb scan threshold (e.g., 1 million read operations). Accordingly, the second read disturb scan may be performed in response to the block read counter reaching the second read disturb scan threshold (e.g., or the first read disturb scan threshold plus the second read disturb scan threshold, such as 1.75 million read operations, 1.75 million read operations plus additional previous read disturb scan thresholds).

In another example, if the highest failure bit count satisfies the second threshold 305-b (T2) and fails to satisfy a third threshold 305-c (T3), the memory system may perform a second read disturb scan at 50% of the first read disturb scan threshold. In other words, the second read disturb scan threshold (e.g., 500,000 read operations) may be adjusted to half of the first read disturb scan threshold (e.g., 1 million read operations). Accordingly, the second read disturb scan may be performed in response to the block read counter reaching the second read disturb scan threshold, (e.g., or the first read disturb scan threshold plus the second read disturb scan threshold, such as 1.5 million read operations, 1.5 million read operations plus additional previous read disturb scan thresholds).

In another example, if the highest failure bit count satisfies the third threshold 305-b (T3) and fails to satisfy a fourth threshold 305-d (T4), the memory system may perform a second read disturb scan at 25% of the first read disturb scan threshold. In other words, the second read disturb scan threshold (e.g., 250,000 read operations) may be adjusted to one-quarter of the first read disturb scan threshold (e.g., 1 million read operations). Accordingly, the second read disturb scan may be performed in response to the block read counter reaching the second read disturb scan threshold (e.g., or the first read disturb scan threshold plus the second read disturb scan threshold, such as 1.25 million read operations, 1.25 million read operations plus additional previous read disturb scan thresholds).

In another example, if the highest failure bit count satisfies the fourth threshold 305-d (T4), the memory system may perform the refresh operation 315. Here, the second read disturb scan threshold (e.g., 1M reads) may be the same as the first (e.g., original) read disturb scan threshold (e.g., 1M reads) and the block read counter may be reset. That is, the first read disturb scan threshold may remain unchanged. Accordingly, the second read disturb scan may be performed in response to the block read counter reaching the first read disturb scan threshold (e.g., or the first read disturb scan threshold plus the first read disturb scan threshold (e.g., 2 million read operations, 2 million read operations plus additional previous read disturb scan thresholds).

In some examples, if, in response to the second read disturb scan, a highest failure bit count fails to satisfy the fourth failure bit count threshold (e.g., the memory system does not perform the refresh operation 315), the memory system may compare the failure bit counts of the block to the one or more failure bit count thresholds 305. In some examples, the memory system may set a third read disturb scan threshold adjusted (e.g., scaled) from the first (e.g., original) read disturb scan threshold. In other words, the memory system may perform an operation 310 to adjust the first read disturb scan threshold (e.g., scale the first read disturb scan threshold) to set the third read disturb scan threshold as the threshold quantity of read operations that triggers a subsequent (e.g., next) read disturb scan. For example, if after (e.g., in response to) the second read disturb scan, the highest failure bit count satisfies the third threshold 305-c (T3) and fails to satisfy the fourth threshold 305-d (T4), the memory system may perform a third read disturb scan at 25% of the first read disturb scan threshold. In other words, the third read disturb scan threshold (e.g., 250,000 read operations) may be adjusted to one-quarter of the first read disturb scan threshold (e.g., 1 million read operations).

In some examples, the memory system may set the third read disturb scan threshold adjusted (e.g., scaled) from the second read disturb scan threshold. In other words, the memory system may perform an operation 310 to adjust the second read disturb scan threshold (e.g., scale the second threshold) to set the third read disturb scan threshold as the threshold quantity of read operations that triggers a subsequent (e.g., next) read disturb scan. For example, if after (e.g., in response to) the second read disturb scan, the highest failure bit count satisfies the third threshold 305-c (T3) and fails to satisfy the fourth threshold 305-d (T4), the memory system may perform a third read disturb scan at 25% of the second read disturb scan threshold. In other words, the third read disturb scan threshold (e.g., 125,000 read operations) may be adjusted to one-quarter of the second read disturb scan threshold (e.g., 500,000 read operations).

Any quantity of failure bit count thresholds 305 of any value may be possible. There may also be any quantity of operations 310 corresponding to failure bit count thresholds 305. In some examples, there may be four failure bit count thresholds 305 (T1, T2, T3, and T4), but other examples may include a fifth failure bit count threshold 305 (T5) or three failure bit count thresholds (no T4), among other possibilities. The operations 310 may include scaling the read disturb scan threshold by any number. For example, in the example of FIG. 3, the operation 310-a may scale a read disturb scan threshold by 75%, the operation 310-b may scale the read disturb scan by 50%, and so on, but other examples may have different scaling factors corresponding to the failure bit count thresholds 305.

Reducing the read disturb scan threshold for triggering the read disturb scan reduces unnecessary refreshes while mitigating the effects of read disturbs and maintaining accuracy in the memory array. A refresh operation 315 may not be performed until a certain threshold (e.g., threshold 305-d, T4) is satisfied. As a failure bit count approaches the failure bit count threshold for refreshing (e.g., T4), a read disturb scan may be performed more often (e.g., after a fewer quantity of block read counts) in accordance with adjusting the read disturb scan threshold. The more frequent read disturb scans may allow the memory system to perform a refresh operation 315 closer to the time (e.g., quantity of read operations) at which the failure bit count reaches the failure bit count threshold for performing the refresh operation 315 (e.g., compared to if the read disturb scan threshold was a static value).

Figure 4:
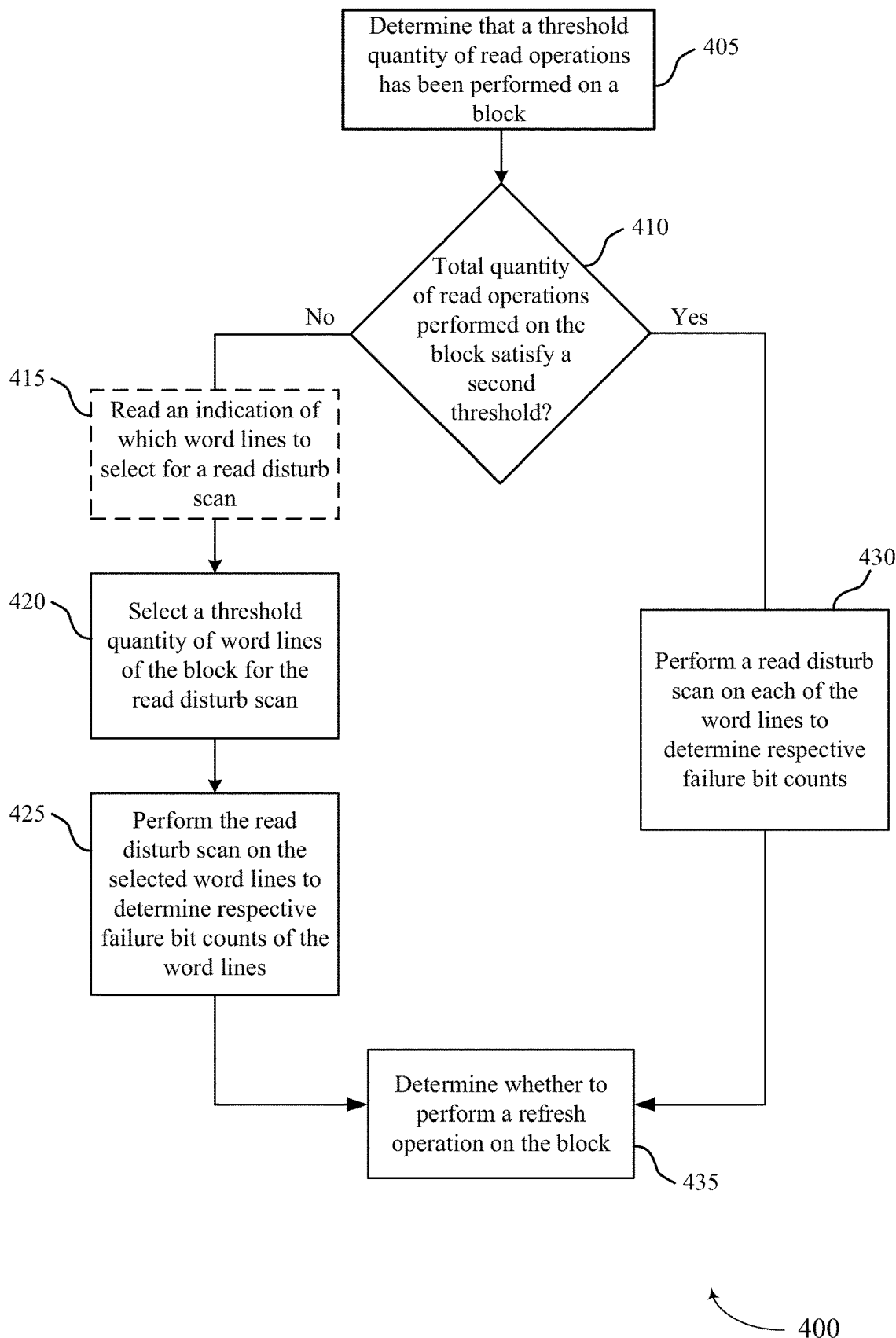
FIGS. 4 and 5 illustrate examples of flowcharts that support efficient read disturb scanning in accordance with examples as disclosed herein.

FIG. 4 illustrates an example of a flowchart 400 that supports efficient read disturb scanning in accordance with examples as disclosed herein. The flowchart 400 may implement, or be implemented by, aspects of the system 100 and the memory system 200 as described herein. For example, the flowchart 400 may be implemented by a memory system, which may be examples of the memory systems as described herein, including with reference to FIGS. 1 through 3. In the following description of the flowchart 400, the methods, techniques, processes, and operations may be performed in different orders or at different times. Further, certain operations may be left out of the flowchart 400, or other operations may be added to the flowchart 400.

Aspects of the flowchart 400 may be implemented by a controller, among other components. Additionally, or alternatively, aspects of the flowchart 400 may be implemented as instructions stored in memory (e.g., firmware stored in a memory coupled with the memory system). For example, the instructions, when executed by one or more controllers (e.g., memory system controller(s) 115), may cause the one or more controllers to perform the operations of the flowchart 400.

At 405, a first threshold quantity of read operations may be determined to have been performed on a block of the memory system. For example, the memory system may determine that the first threshold quantity of read operations has been performed on the block (e.g., via a block read counter 230 satisfying a threshold). For instance, for each read operation performed on the block, the memory system may increment a block read counter that tracks the quantity of read operations performed on the block. Accordingly, the value of the block read counter may indicate to the memory system that the first threshold quantity of read operations has been performed on the block.

At 410, a total quantity of read operations performed on the block of the memory system may be evaluated as to whether a second threshold is satisfied. For example, the memory system may determine whether the total quantity of read operations performed on the block (e.g., via a total block read counter 235) has satisfied the second threshold (e.g., has reached a quantity greater than, a quantity greater than or equal to). The second threshold may be associated with a degradation (e.g., wear, aging) of the memory system. For example, at higher quantities of read operations, a subset of word lines (e.g., word lines 225) that were characterized as having higher bit error rates compared to other word lines in the block may no longer have the highest bit error rates.

If the first threshold quantity of read operations is satisfied to trigger a read disturb, but not the second threshold of the total quantity of read operations, at 415, an indication of which word lines to select for a read disturb scan may be read. For example, the memory system may read an indication (such as indication 240 stored in the device 202) of which word lines to select for the read disturb scan. For instance, the second threshold may indicate whether to limit the selection of word lines for the read disturb scan or to scan each word line of the block as part of the read disturb scan. Accordingly, failure of the total quantity of read operations to satisfy the second threshold may indicate that the characterization of the word lines of the block is still accurate and the selection of the word lines may be limited for the read disturb scan. As such, the indication may be read in response to the quantity of read operations satisfying the first threshold quantity of read operations and the total quantity of read operations failing to satisfy the second threshold of the total quantity of read operations. That is, the indication may be read while the total quantity of read operations performed on the block fails to satisfy the second threshold.

At 420, a threshold quantity of word lines of the block may be selected for the read disturb scan. For example, the memory system may select the threshold quantity of word lines from the block for the read disturb scan, such as in accordance with the indication read at 415. The selected word lines may correspond to word lines 225 (e.g., the word lines with the highest bit error rates compared to other word line bit error rates in the block). The threshold quantity of word lines may be a configured quantity of word lines (e.g., indicated by the indication) or may be a quantity based on a total quantity of word lines of the block (e.g., a threshold percentage of total word lines). The threshold quantity of word lines may be less than the total quantity of word lines included in the block.

At 425, the read disturb scan may be performed on the selected word lines to determine respective failure bit counts of the word lines. For example, the memory system may perform the read disturb scan on each of the one or more selected word lines to determine respective failure bit counts of each of the one or more word lines. Unselected word lines may be excluded from the read disturb scan. For example, the memory system may refrain from performing the read disturb scan on unselected word lines. The unselected word lines may be a subset of the word lines of the block that were not selected, such as based on the indication. A read disturb scan of a word line may include reading memory cells of one or more pages coupled with the word line, and counting a failure of respective bits (e.g., failure bit counts) stored by the memory cells.

At 435, a determination of whether to perform a refresh operation on the block may be performed. For example, the memory system may determine whether to perform the refresh operation on the block. The determination may be based on whether at least one of the respective failure bit counts of the selected word lines satisfies a threshold failure bit count (e.g., a failure bit count threshold 305-$d$, T4). Further details related to this determination and the operations performed by the memory system based on the determination are described with reference to FIG. 5.

If, at 410, the total quantity of read operations performed on the block satisfies the second threshold, at 430, a read disturb scan may be performed on each of the word lines to determine respective failure bit counts. For example, the total quantity of read operations satisfying the second threshold may indicate that the characterization of the word lines of the block is no longer accurate and the selection of the word lines may be expanded to include each of the word lines of the block for the read disturb scan. As such, the memory system may perform the read disturb scan on each of the word lines to determine respective failure bit counts of each of the word lines of the block.

At 435, the determination of whether to perform the refresh operation on the block may be performed. For example, the memory system may determine whether to perform the refresh operation on the block based on whether at least one respective failure bit counts of the word lines satisfies the threshold failure bit count.

Figure 5:
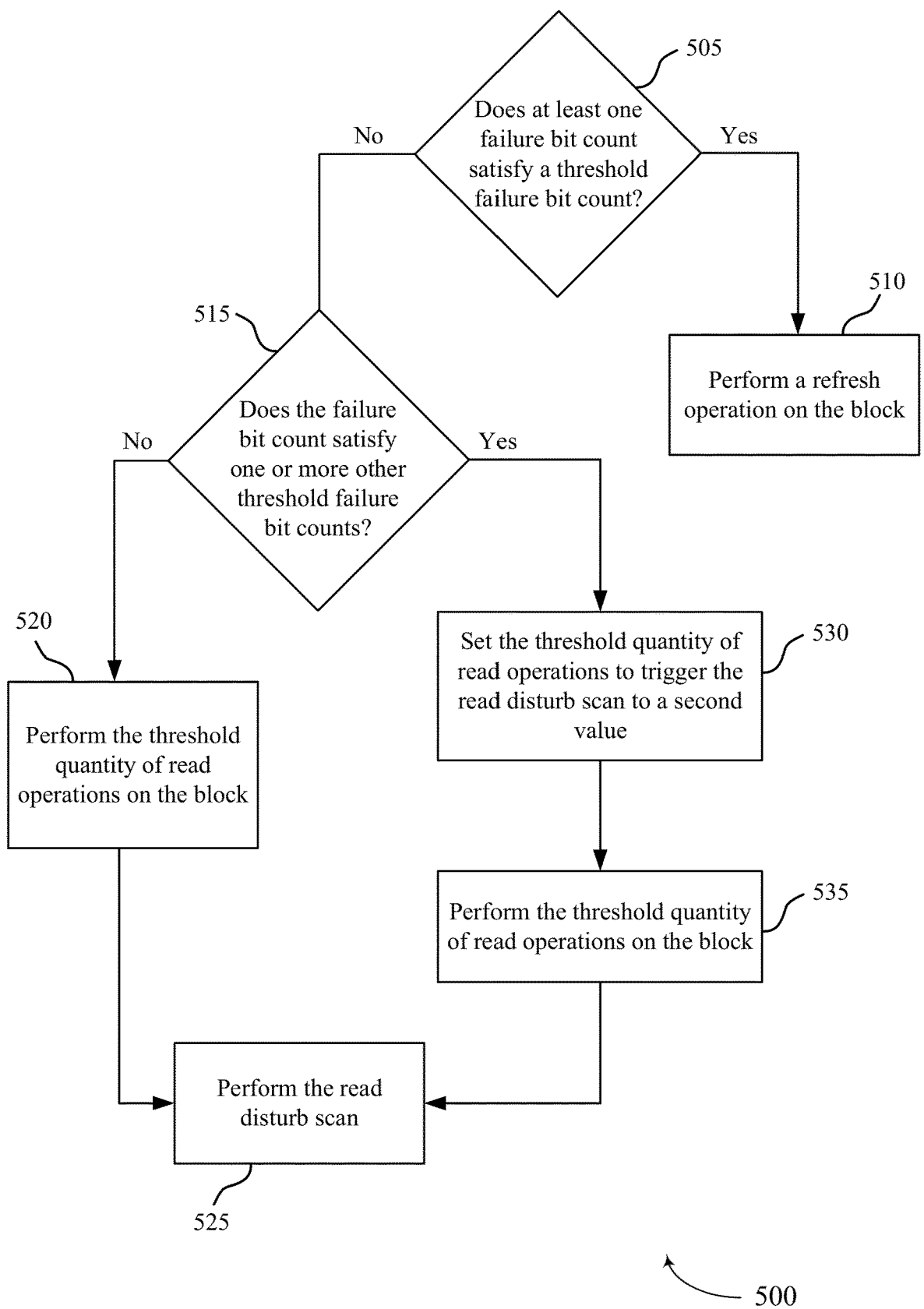

FIG. 5 illustrates an example of a flowchart 500 that supports efficient read disturb scanning in accordance with examples as disclosed herein. The flowchart 500 may implement, or be implemented by, aspects of the system 100 and the memory system 200 as described herein. For example, the flowchart 500 may be implemented by a memory system, which may be examples of the memory systems as described herein, including with reference to FIGS. 1 through 3. The flowchart 500 may be a continuation of the flowchart 400, such as expanding upon the determination of whether to perform the refresh operation at 435 as described with reference to FIG. 4. In the following description of the flowchart 500, the methods, techniques, processes, and operations may be performed in different orders or at different times. Further, certain operations may be left out of the flowchart 500, or other operations may be added to the flowchart 500.

Aspects of the flowchart 500 may be implemented by a controller, among other components. Additionally, or alternatively, aspects of the flowchart 500 may be implemented as instructions stored in memory (e.g., firmware stored in a memory coupled with the memory system). For example, the instructions, when executed by one or more controllers (e.g., memory system controller(s) 115), may cause the one or more controllers to perform the operations of the flowchart 500.

At 505, a determination of whether at least one failure bit count satisfies a threshold failure bit count may be performed. For example, the memory system may determine whether at least one failure bit count of selected word lines (e.g., a subset of the total word lines selected at 420 or all of the word lines scanned at 430) satisfies a first threshold failure bit count (e.g., threshold 305-d, T4).

If at least one failure bit count satisfies the first threshold failure bit count, at 510, a refresh operation may be performed on the block. For example, the memory device may perform the refresh operation on the block.

If no failure bit count satisfies the first threshold failure bit count (e.g., threshold 305-d, T4), at 515, a determination of whether the failure bit count satisfies one or more other threshold failure bit counts may be performed. For example, the memory system may determine whether the failure bit count satisfies the one or more other threshold failure bit counts, such as thresholds 305-a, 305-b, or 305-c (T1, T2, or T3). The thresholds may be ordered such that T1<T2<T3. The memory system may use the highest satisfied threshold. In other words, if the failure bit count satisfies the threshold 305-b, it may also satisfy threshold 305-a, however the device may use threshold 305-b and not threshold 305-a when determining a corresponding operation 310 because threshold 305-b is higher than threshold 305-a (e.g., operation 310-b is used and not the operation 310-a).

If no failure bit count satisfies the one or more other threshold failure bit counts, at 520, the first threshold quantity of read operations may be performed on the block. For example, the memory system may perform the threshold quantity of read operations on the block if none of the thresholds 305-a, 305-b, or 305-c is satisfied. That is, the first threshold quantity of read operations may remain unchanged to trigger a next read disturb scan performed by the memory system. The thresholds may be ordered such that T1<T2<T3. In other words, if threshold 305-a is not satisfied, none of the other thresholds (e.g., 305-b, 305-c) may be satisfied.

At 525, the memory system performs the read disturb scan as described with reference to FIG. 4. The read disturb scan may determine a second failure bit count associated with the word lines of the block. The memory system may determine whether to perform a refresh operation on the block based on whether the second failure bit count satisfies a threshold failure bit count threshold.

If one or more other threshold failure bit counts (e.g., one or more threshold 305-a, 305-b, or 305-c) is satisfied at 515, at 530 a threshold quantity of read operations to trigger the read disturb scan may be set to a second value. For example, the memory system may set the first threshold quantity of read operations to trigger the read disturb scan to a second (e.g., lower) value, as described in FIG. 3. For instance, the memory system may adjust (e.g., scale) the first threshold quantity of read operations that triggers the read disturb scan to the second value in accordance with the satisfaction of a threshold 305, as described with reference to FIG. 3 (e.g., the read disturb scan threshold may decrease from one million read operations to 250,000 read operations).

At 535, a threshold quantity of read operations may be performed on the block. For example, the memory system may perform the threshold quantity of read operations on the block, the threshold quantity of read operations having the second value (e.g., the new read disturb scan threshold) determined at 530.

At 525, the read disturb scan may be performed. For example, the memory system may perform the read disturb scan on the block as described in FIG. 4. The read disturb scan may determine a second failure bit count associated with the word lines of the block. The memory system may determine whether to perform a refresh operation on the block based on whether the second failure bit count satisfies a threshold failure bit count.

Figure 6:
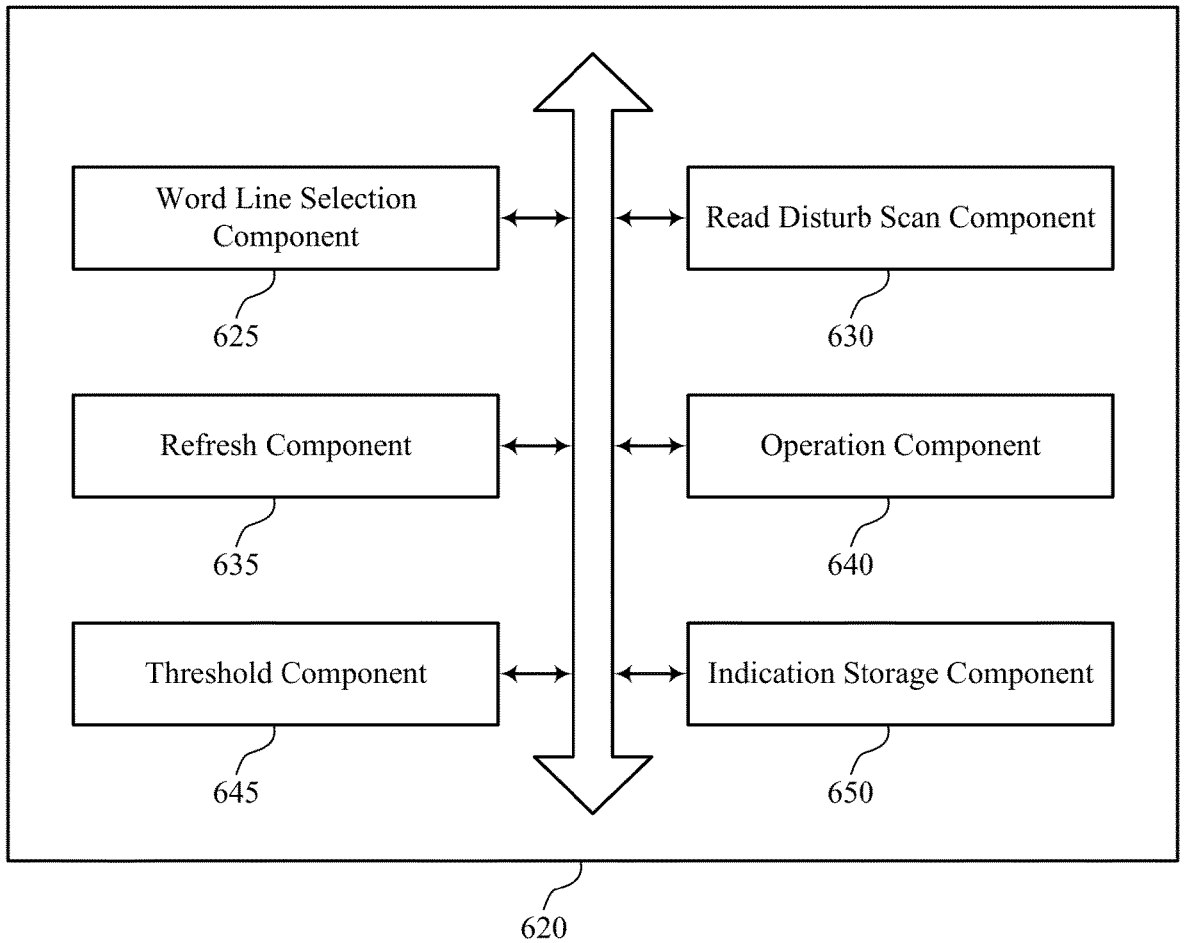
FIG. 6 illustrates a block diagram of a memory system that supports efficient read disturb scanning in accordance with examples as disclosed herein.

FIG. 6 illustrates a block diagram 600 of a memory system 620 that supports efficient read disturb scanning in accordance with examples as disclosed herein. The memory system 620 may be an example of aspects of a memory system as described with reference to FIGS. 1 through 5. The memory system 620, or various components thereof, may be an example of means for performing various aspects of efficient read disturb scanning as described herein. For example, the memory system 620 may include a word line selection component 625, a read disturb scan component 630, a refresh component 635, an operation component 640, a threshold component 645, an indication storage component 650, or any combination thereof. Each of these components may communicate, directly or indirectly, with one another (e.g., via one or more buses).

The word line selection component 625 may be configured as or otherwise support a means for selecting, based at least in part on a quantity of read operations performed on a block of a memory system (e.g., memory system 620) satisfying a threshold quantity of read operations, a word line from a set of word lines of the block for a read disturb scan. The read disturb scan component 630 may be configured as or otherwise support a means for performing the read disturb scan on the word line to determine a failure bit count associated with the word line. The refresh component 635 may be configured as or otherwise support a means for determining whether to perform a refresh operation on the block based at least in part on whether the failure bit count satisfies a threshold failure bit count. The operation component 640 may be configured as or otherwise support a means for performing an operation based at least in part on determining whether to perform the refresh operation.

In some examples, to support selecting the word line, the word line selection component 625 may be configured as or otherwise support a means for selecting the word line for the read disturb scan based at least in part on the word line being associated with a highest bit error rate of bit error rates associated with the word lines of the set of word lines.

In some examples, to support selecting the word line, the word line selection component 625 may be configured as or otherwise support a means for selecting a threshold quantity of word lines of the set of word lines for the read disturb scan, the threshold quantity of word lines being associated with higher bit error rates than bit error rates associated with other word lines of the set of word lines, where the read disturb scan is performed on the threshold quantity of word lines to determine a respective failure bit count associated with each of the threshold quantity of word lines, and where the determination of whether to perform the refresh operation is based at least in part on whether at least one of the respective failure bit counts satisfies the threshold failure bit count.

In some examples, the threshold quantity of word lines is based at least in part on a total quantity of word lines of the block.

In some examples, the word line selection component 625 may be configured as or otherwise support a means for reading an indication that the word line is to be selected for the read disturb scan based at least in part on the quantity of read operations satisfying the threshold quantity of read operations, where the word line is selected based at least in part on reading the indication.

In some examples, the indication storage component 650 may be configured as or otherwise support a means for storing the indication that the word line is to be selected for the read disturb scan, where reading the indication is based at least in part on storing the indication.

In some examples, the indication is statically stored to the memory system.

In some examples, the word line selection component 625 may be configured as or otherwise support a means for reading an indication that the word line is to be selected for the read disturb scan while a total quantity of read operations performed on the block fails to satisfy a second threshold quantity of read operations, where the indication is read based at least in part on the quantity of read operations satisfying the threshold quantity of read operations and the total quantity of read operations failing to satisfy the second threshold quantity of read operations, where the word line is selected based at least in part on reading the indication.

In some examples, to support performing the read disturb scan, the read disturb scan component 630 may be configured as or otherwise support a means for refraining from performing the read disturb scan on one or more unselected word lines of the set of word lines.

In some examples, to support selecting the word line, the word line selection component 625 may be configured as or otherwise support a means for selecting the word line from the set of word lines for the read disturb scan and excluding one or more other word lines from the set of word lines for the read disturb scan based at least in part on a total quantity of read operations performed on the block failing to satisfy a second threshold quantity of read operations.

In some examples, the threshold component 645 may be configured as or otherwise support a means for determining, after performing the operation, that a total quantity of read operations performed on the block satisfies a second threshold quantity of read operations. In some examples, the word line selection component 625 may be configured as or otherwise support a means for selecting, based at least in part on the total quantity of read operations satisfying the second threshold quantity of read operations, the set of word lines of the block for a second read disturb scan. In some examples, the read disturb scan component 630 may be configured as or otherwise support a means for performing the second read disturb scan on the set of word lines to determine a respective second failure bit count associated with each word line of the set of word lines. In some examples, the refresh component 635 may be configured as or otherwise support a means for determining whether to perform the refresh operation on the block based at least in part on whether at least one of the respective second failure bit counts satisfy the threshold failure bit count.

In some examples, to support performing the operation, the refresh component 635 may be configured as or otherwise support a means for performing the refresh operation on the block based at least in part on the failure bit count satisfying the threshold failure bit count.

In some examples, to support performing the operation, the threshold component 645 may be configured as or otherwise support a means for setting the threshold quantity of read operations to a second threshold quantity of read operations associated with triggering the read disturb scan based at least in part on the failure bit count satisfying a second threshold failure bit count and failing to satisfy the threshold failure bit count.

In some examples, the read disturb scan component 630 may be configured as or otherwise support a means for performing, based at least in part on performing a second quantity of read operations on the block that satisfies the second threshold quantity of read operations, a second read disturb scan on the word line to determine a second failure bit count associated with the word line. In some examples, the refresh component 635 may be configured as or otherwise support a means for determining whether to perform the refresh operation on the block based at least in part on whether the second failure bit count satisfies the threshold failure bit count.

In some examples, the threshold component 645 may be configured as or otherwise support a means for determining that the quantity of read operations performed on the block of the memory system satisfies the threshold quantity of read operations, where selecting the word line is based at least in part on the determining.

Figure 7:
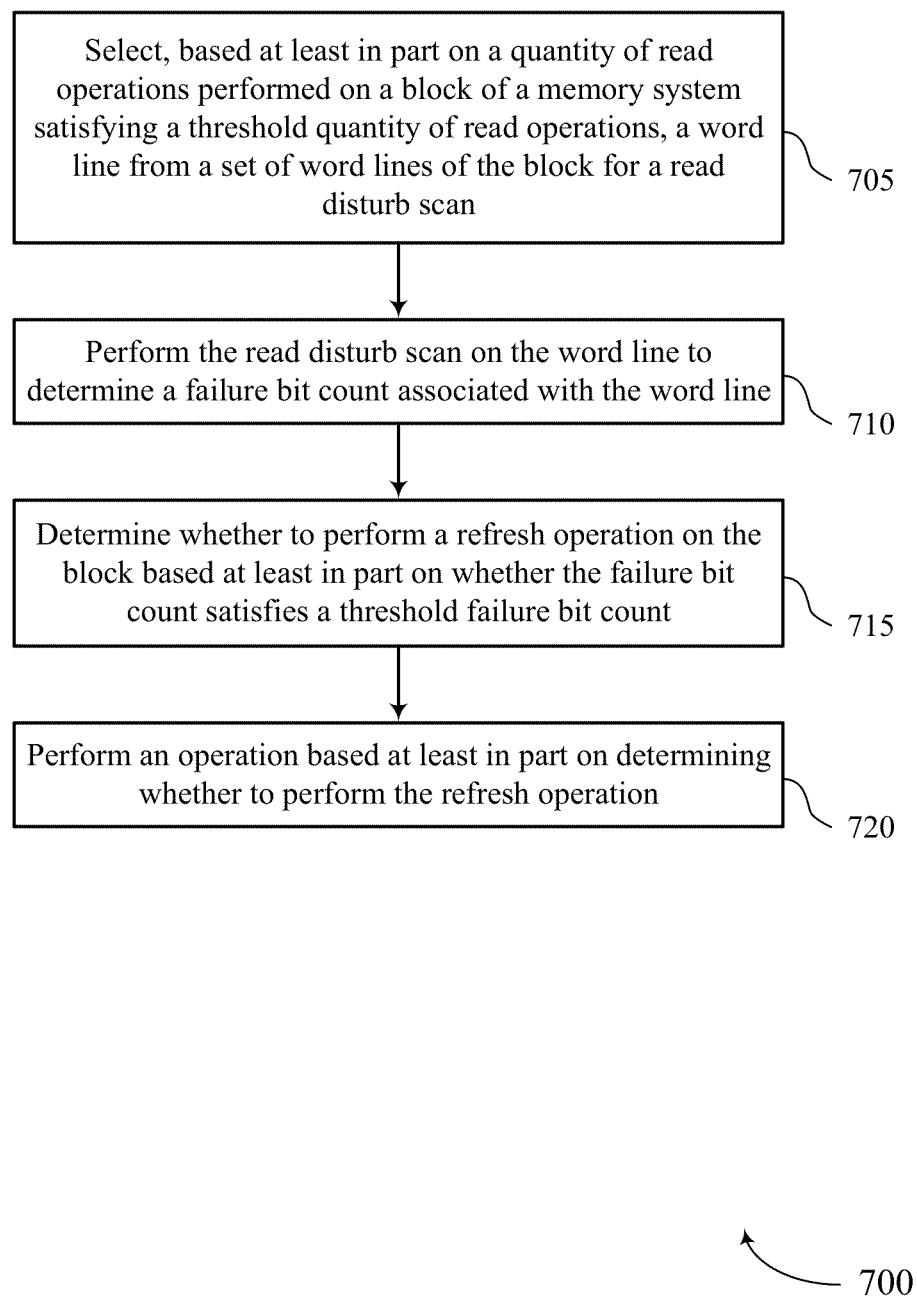
FIG. 7 illustrates a flowchart showing a method or methods that support efficient read disturb scanning in accordance with examples as disclosed herein.

FIG. 7 illustrates a flowchart showing a method 700 that supports efficient read disturb scanning in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include selecting, based at least in part on a quantity of read operations performed on a block of a memory system satisfying a threshold quantity of read operations, a word line from a set of word lines of the block for a read disturb scan. The operations of 705 may be performed in accordance with examples as disclosed herein. In some examples, aspects of the operations of 705 may be performed by a word line selection component 625 as described with reference to FIG. 6.

At 710, the method may include performing the read disturb scan on the word line to determine a failure bit count associated with the word line. The operations of 710 may be performed in accordance with examples as disclosed herein. In some examples, aspects of the operations of 710 may be performed by a read disturb scan component 630 as described with reference to FIG. 6.

At 715, the method may include determining whether to perform a refresh operation on the block based at least in part on whether the failure bit count satisfies a threshold failure bit count. The operations of 715 may be performed in accordance with examples as disclosed herein. In some examples, aspects of the operations of 715 may be performed by a refresh component 635 as described with reference to FIG. 6.

At 720, the method may include performing an operation based at least in part on determining whether to perform the refresh operation. The operations of 720 may be performed in accordance with examples as disclosed herein. In some examples, aspects of the operations of 720 may be performed by an operation component 640 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for selecting, based at least in part on a quantity of read operations performed on a block of a memory system satisfying a threshold quantity of read operations, a word line from a set of word lines of the block for a read disturb scan; performing the read disturb scan on the word line to determine a failure bit count associated with the word line; determining whether to perform a refresh operation on the block based at least in part on whether the failure bit count satisfies a threshold failure bit count; and performing an operation based at least in part on determining whether to perform the refresh operation.

Aspect 2: The method, apparatus, or non-transitory computer-readable medium of aspect 1, where selecting the word line includes operations, features, circuitry, logic, means, or instructions, or any combination thereof for selecting the word line for the read disturb scan based at least in part on the word line being associated with a highest bit error rate of bit error rates associated with the word lines of the set of word lines.

Aspect 3: The method, apparatus, or non-transitory computer-readable medium of any of aspects 1 through 2, where selecting the word line includes operations, features, circuitry, logic, means, or instructions, or any combination thereof for selecting a threshold quantity of word lines of the set of word lines for the read disturb scan, the threshold quantity of word lines being associated with higher bit error rates than bit error rates associated with other word lines of the set of word lines, where the read disturb scan is performed on the threshold quantity of word lines to determine a respective failure bit count associated with each of the threshold quantity of word lines, and where the determination of whether to perform the refresh operation is based at least in part on whether at least one of the respective failure bit counts satisfies the threshold failure bit count.

Aspect 4: The method, apparatus, or non-transitory computer-readable medium of any of aspects 1 through 3, where the threshold quantity of word lines is based at least in part on a total quantity of word lines of the block.

Aspect 5: The method, apparatus, or non-transitory computer-readable medium of any of aspects 1 through 4, further including operations, features, circuitry, logic, means, or instructions, or any combination thereof for reading an indication that the word line is to be selected for the read disturb scan based at least in part on the quantity of read operations satisfying the threshold quantity of read operations, where the word line is selected based at least in part on reading the indication.

Aspect 6: The method, apparatus, or non-transitory computer-readable medium of aspect 5, further including operations, features, circuitry, logic, means, or instructions, or any combination thereof for storing the indication that the word line is to be selected for the read disturb scan, where reading the indication is based at least in part on storing the indication.

Aspect 7: The method, apparatus, or non-transitory computer-readable medium of aspect 6, where the indication is statically stored to the memory system.

Aspect 8: The method, apparatus, or non-transitory computer-readable medium of any of aspects 1 through 7, further including operations, features, circuitry, logic, means, or instructions, or any combination thereof for reading an indication that the word line is to be selected for the read disturb scan while a total quantity of read operations performed on the block fails to satisfy a second threshold quantity of read operations, where the indication is read based at least in part on the quantity of read operations satisfying the threshold quantity of read operations and the total quantity of read operations failing to satisfy the second threshold quantity of read operations, where the word line is selected based at least in part on reading the indication.

Aspect 9: The method, apparatus, or non-transitory computer-readable medium of any of aspects 1 through 8, where performing the read disturb scan includes operations, features, circuitry, logic, means, or instructions, or any combination thereof for refraining from performing the read disturb scan on one or more unselected word lines of the set of word lines.

Aspect 10: The method, apparatus, or non-transitory computer-readable medium of any of aspects 1 through 9, where selecting the word line includes operations, features, circuitry, logic, means, or instructions, or any combination thereof for selecting the word line from the set of word lines for the read disturb scan and excluding one or more other word lines from the set of word lines for the read disturb scan based at least in part on a total quantity of read operations performed on the block failing to satisfy a second threshold quantity of read operations.

Aspect 11: The method, apparatus, or non-transitory computer-readable medium of any of aspects 1 through 10, further including operations, features, circuitry, logic, means, or instructions, or any combination thereof for determining, after performing the operation, that a total quantity of read operations performed on the block satisfies a second threshold quantity of read operations; selecting, based at least in part on the total quantity of read operations satisfying the second threshold quantity of read operations, the set of word lines of the block for a second read disturb scan; performing the second read disturb scan on the set of word lines to determine a respective second failure bit count associated with each word line of the set of word lines; and determining whether to perform the refresh operation on the block based at least in part on whether at least one of the respective second failure bit counts satisfy the threshold failure bit count.

Aspect 12: The method, apparatus, or non-transitory computer-readable medium of any of aspects 1 through 11, where performing the operation includes operations, features, circuitry, logic, means, or instructions, or any combination thereof for performing the refresh operation on the block based at least in part on the failure bit count satisfying the threshold failure bit count.

Aspect 13: The method, apparatus, or non-transitory computer-readable medium of any of aspects 1 through 11, where performing the operation includes operations, features, circuitry, logic, means, or instructions, or any combination thereof for setting the threshold quantity of read operations to a second threshold quantity of read operations associated with triggering the read disturb scan based at least in part on the failure bit count satisfying a second threshold failure bit count and failing to satisfy the threshold failure bit count.

Aspect 14: The method, apparatus, or non-transitory computer-readable medium of aspect 13, further including operations, features, circuitry, logic, means, or instructions, or any combination thereof for performing, based at least in part on performing a second quantity of read operations on the block that satisfies the second threshold quantity of read operations, a second read disturb scan on the word line to determine a second failure bit count associated with the word line and determining whether to perform the refresh operation on the block based at least in part on whether the second failure bit count satisfies the threshold failure bit count.

Aspect 15: The method, apparatus, or non-transitory computer-readable medium of any of aspects 1 through 14, further including operations, features, circuitry, logic, means, or instructions, or any combination thereof for determining that the quantity of read operations performed on the block of the memory system satisfies the threshold quantity of read operations, where selecting the word line is based at least in part on the determining.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more memory devices; and
one or more controllers coupled with the one or more memory devices, wherein the one or more controllers are configured to cause the apparatus to:
select, based at least in part on a quantity of read operations performed on a block of the apparatus satisfying a threshold quantity of read operations, a word line from a set of word lines of the block for a read disturb scan;
perform the read disturb scan on the word line to determine a failure bit count associated with the word line;
determine whether to perform a refresh operation on the block based at least in part on whether the failure bit count satisfies a threshold failure bit count; and
perform an operation based at least in part on determining whether to perform the refresh operation.

2. The apparatus of claim 1, wherein selecting the word line is configured to cause the apparatus to:
select the word line for the read disturb scan based at least in part on the word line being associated with a highest bit error rate of bit error rates associated with word lines of the set of word lines.

3. The apparatus of claim 1, wherein selecting the word line is configured to cause the apparatus to:

select a threshold quantity of word lines of the set of word lines for the read disturb scan, the threshold quantity of word lines being associated with higher bit error rates than bit error rates associated with other word lines of the set of word lines, wherein the read disturb scan is performed on the threshold quantity of word lines to determine a respective failure bit count associated with each of the threshold quantity of word lines, and wherein the determination of whether to perform the refresh operation is based at least in part on whether at least one of the respective failure bit counts satisfies the threshold failure bit count.

4. The apparatus of claim 3, wherein the threshold quantity of word lines is based at least in part on a total quantity of word lines of the block.

5. The apparatus of claim 1, wherein the one or more controllers are further configured to cause the apparatus to:
read an indication that the word line is to be selected for the read disturb scan based at least in part on the quantity of read operations satisfying the threshold quantity of read operations, wherein the word line is selected based at least in part on reading the indication.

6. The apparatus of claim 5, wherein the one or more controllers are further configured to cause the apparatus to:
store the indication that the word line is to be selected for the read disturb scan, wherein reading the indication is based at least in part on storing the indication.

7. The apparatus of claim 6, wherein the indication is statically stored to the apparatus.

8. The apparatus of claim 1, wherein the one or more controllers are further configured to cause the apparatus to:
read an indication that the word line is to be selected for the read disturb scan while a total quantity of read operations performed on the block fails to satisfy a second threshold quantity of read operations, wherein the indication is read based at least in part on the quantity of read operations satisfying the threshold quantity of read operations and the total quantity of read operations failing to satisfy the second threshold quantity of read operations, wherein the word line is selected based at least in part on reading the indication.

9. The apparatus of claim 1, wherein performing the read disturb scan is configured to cause the apparatus to:
refrain from performing the read disturb scan on one or more unselected word lines of the set of word lines.

10. The apparatus of claim 1, wherein selecting the word line is configured to cause the apparatus to:
select the word line from the set of word lines for the read disturb scan and excluding one or more other word lines from the set of word lines for the read disturb scan based at least in part on a total quantity of read operations performed on the block failing to satisfy a second threshold quantity of read operations.

11. The apparatus of claim 1, wherein the one or more controllers are further configured to cause the apparatus to:
determine, after performing the operation, that a total quantity of read operations performed on the block satisfies a second threshold quantity of read operations;
select, based at least in part on the total quantity of read operations satisfying the second threshold quantity of read operations, the set of word lines of the block for a second read disturb scan;
perform the second read disturb scan on the set of word lines to determine a respective second failure bit count associated with each word line of the set of word lines; and determine whether to perform the refresh operation on the block based at least in part on whether at least one of the respective second failure bit counts satisfy the threshold failure bit count.

12. The apparatus of claim 1, wherein performing the operation is configured to cause the apparatus to:
perform the refresh operation on the block based at least in part on the failure bit count satisfying the threshold failure bit count.

13. The apparatus of claim 1, wherein performing the operation is configured to cause the apparatus to:
set the threshold quantity of read operations to a second threshold quantity of read operations associated with triggering the read disturb scan based at least in part on the failure bit count satisfying a second threshold failure bit count and failing to satisfy the threshold failure bit count.

14. The apparatus of claim 13, wherein the one or more controllers are further configured to cause the apparatus to:
perform, based at least in part on performing a second quantity of read operations on the block that satisfies the second threshold quantity of read operations, a second read disturb scan on the word line to determine a second failure bit count associated with the word line; and
determine whether to perform the refresh operation on the block based at least in part on whether the second failure bit count satisfies the threshold failure bit count.

15. The apparatus of claim 1, wherein the one or more controllers are further configured to cause the apparatus to:
determine that the quantity of read operations performed on the block of the apparatus satisfies the threshold quantity of read operations, wherein selecting the word line is based at least in part on the determining.

16. A non-transitory computer-readable medium storing code, the code comprising instructions executable by a processor to:
select, based at least in part on a quantity of read operations performed on a block of a memory system satisfying a threshold quantity of read operations, a word line from a set of word lines of the block for a read disturb scan;
perform the read disturb scan on the word line to determine a failure bit count associated with the word line;
determine whether to perform a refresh operation on the block based at least in part on whether the failure bit count satisfies a threshold failure bit count; and
perform an operation based at least in part on determining whether to perform the refresh operation.

17. The non-transitory computer-readable medium of claim 16, wherein the instructions to select the word line are executable by the processor to:
select the word line for the read disturb scan based at least in part on the word line being associated with a highest bit error rate of bit error rates associated with word lines of the set of word lines.

18. The non-transitory computer-readable medium of claim 16, wherein the instructions to select the word line are executable by the processor to:
select a threshold quantity of word lines of the set of word lines for the read disturb scan, the threshold quantity of word lines being associated with higher bit error rates than bit error rates associated with other word lines of the set of word lines, wherein the read disturb scan is performed on the threshold quantity of word lines to determine a respective failure bit count associated with each of the threshold quantity of word lines, and wherein the determination of whether to perform the refresh operation is based at least in part on whether at least one of the respective failure bit counts satisfies the threshold failure bit count.

19. The non-transitory computer-readable medium of claim 16, wherein the instructions are further executable by the processor to:

read an indication that the word line is to be selected for the read disturb scan based at least in part on the quantity of read operations satisfying the threshold quantity of read operations, wherein the word line is selected based at least in part on reading the indication.

20. A method, comprising:

selecting, based at least in part on a quantity of read operations performed on a block of a memory system satisfying a threshold quantity of read operations, a word line from a set of word lines of the block for a read disturb scan;

performing the read disturb scan on the word line to determine a failure bit count associated with the word line;

determining whether to perform a refresh operation on the block based at least in part on whether the failure bit count satisfies a threshold failure bit count; and performing an operation based at least in part on determining whether to perform the refresh operation.

* * * * *